(12) United States Patent
Lu et al.

(10) Patent No.: US 6,929,446 B2
(45) Date of Patent: Aug. 16, 2005

(54) COUNTERBALANCED FLOW TURBINE NOZZLE

(75) Inventors: Wenfeng Lu, Mason, OH (US); Russel Michael Castle, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 10/690,916

(22) Filed: Oct. 22, 2003

(65) Prior Publication Data

US 2005/0089394 A1  Apr. 28, 2005

(51) Int. Cl.$^7$ .............................................. F01D 9/02
(52) U.S. Cl. ..................................... 415/115; 415/191
(58) Field of Search ............................... 415/115, 191; 416/97 R (56) References Cited

U.S. PATENT DOCUMENTS

| | | | |
|---|---|---|---|
| 4,616,976 A | 10/1986 | Lings et al. | |
| 4,684,323 A | 8/1987 | Field | |
| 5,356,265 A | 10/1994 | Kercher | |
| 5,383,766 A | 1/1995 | Przirembel et al. | |
| 5,538,394 A | 7/1996 | Inomata et al. | |
| 6,168,381 B1 | 1/2001 | Reddy | |
| 6,183,198 B1 | 2/2001 | Manning et al. | |
| 6,270,317 B1 * | 8/2001 | Manning et al. | 416/97 R |
| 6,354,797 B1 | 3/2002 | Heyward | |
| 6,428,273 B1 | 8/2002 | Keith et al. | |
| 6,554,563 B2 * | 4/2003 | Noe et al. | 415/115 |

OTHER PUBLICATIONS

GE Aircraft Engines, CF6-50 Turbine Nozzle, five photos, on sale more than 1 year before Sep. 2003.
GE Aircraft Engines, CF6-80E Turbine Nozzle, two photos, on sale more than 1 year before Sep. 2003.

* cited by examiner

Primary Examiner—Ninh H. Nguyen
(74) Attorney, Agent, or Firm—William S. Andes; Francis L. Conte (57) ABSTRACT

A turbine nozzle includes hollow vanes extending between outer and inner bands. The vanes include a pattern of outlet holes distributed over the pressure and suction sides thereof for discharging cooling air collectively at a reference flowrate. The pattern of holes includes multiple rows of showerhead holes bridging the leading edge, and two rows of gill holes spaced aft therefrom along the suction side. A row of auxiliary holes is spaced aft from the showerhead holes through the pressure side, and the gill holes are sized to counterbalance the added discharge air through the auxiliary holes for maintaining the reference flowrate.

20 Claims, 5 Drawing Sheets

COUNTERBALANCED FLOW TURBINE NOZZLE

BACKGROUND OF THE INVENTION

The present invention relates generally to gas turbine engines, and, more specifically, to turbine nozzles therein.

In a gas turbine engine air is pressurized in a compressor and mixed with fuel in a combustor for generating hot combustion gases. Energy is extracted from the combustion gases in turbines, with a high pressure turbine (HPT) powering the compressor through a corresponding drive shaft therebetween, and a low pressure turbine providing output power such as powering a fan disposed upstream from the compressor in a turbofan aircraft engine application.

The typical compressor includes multiple axial stages having rotor blades decreasing in size in the downstream direction for pressurizing air in turn. The pressurized air supports combustion of the fuel injected into the combustor, and efficiency of the engine increases with the temperature of the hot combustion gases.

To withstand the hot combustion gases during operation the various combustor and turbine components subject to the heat thereof are typically made of advanced superalloy materials which maintain strength at elevated temperature and promote the durability and long life of the turbine engine. Furthermore, the various hot engine components are typically cooled using a portion of the pressurized air bled from the compressor and channeled through corresponding cooling circuits in the components.

However, any air bled from the compressor which is not utilized in the combustion process decreases the overall efficiency of the engine, and therefore must be kept to a minimum. Accordingly, durability and life of the engine must be balanced against the overall efficiency thereof.

The balance of life and efficiency typically requires various tradeoffs in the design of the various components of the engine, which components are inherently interrelated in function and performance. For example, the prior art relevant to cooling of gas turbine engine components is replete with numerous cooling circuit configurations which vary either greatly, or with minor, but significant changes.

A common example is found in the various configurations of the first stage turbine nozzle which directly receives the hottest combustion gases from the combustor. The high pressure turbine nozzle is typically formed in arcuate segments having a pair of hollow nozzle vanes fixedly joined to outer and inner bands. Pressurized cooling air is bled from the discharge end of the compressor and suitably channeled to the turbine nozzle through the outer or inner bands, or both.

Each nozzle vane has the typical airfoil configuration including a generally concave pressure side and an opposite generally convex suction side which extend in chord axially between leading and trailing edges. The profile of each vane is selected for maximizing efficiency of the nozzle in redirecting the hot combustion gases to the downstream row of HPT rotor blades which extract energy therefrom.

Each nozzle vane typically includes multiple flow passages or cavities therein through which the cooling air is channeled in various, and commonly elaborate, cooling circuits. The internal surfaces of the vanes typically include small turbulators or pins which increase the heat transfer between the internal cooling air and the hot metal sidewalls.

Perforate impingement baffles are typically used in the first stage nozzle for initially directing the cooling air in impingement against the internal surfaces of the vane prior to flow thereof laterally along the inner surfaces for discharge from various outlets formed through the vane sidewalls.

Since the vanes are directly exposed to the hottest combustion gases over their external surfaces, they include various patterns of small outlet holes therethrough which cool the sidewalls themselves, as well as providing a protective film of cooling air between the vane and the hot combustion gases. Film cooling of the external surfaces of the vane is typically provided by inclined film cooling holes extending through the pressure and suction sides of the vane for ensuring a suitable cooling air film over the external surface of the vane.

Since the leading edge of each vane is firstly exposed to the hot combustion gases which split along the opposite pressure and suction sides of the vane, the leading edge typically requires specialized cooling thereof for meeting the desired life or durability requirements of the nozzle.

The combustion gases flow differently over the concave pressure side than over the convex suction side in view of the required aerodynamic performance of those sides for proper efficiency of the turbine nozzle. Accordingly, the pressure and suction sides of each vane have different configurations of the outlet holes therein intended to correspond with the different pressure and temperature distributions of the combustion gases flowing thereover during operation.

The vane airfoil converges in the axially downstream direction to a thin trailing edge which limits the ability to introduce corresponding cooling circuits between the opposite pressure and suction sides. A row of trailing edge outlets is provided in the trailing edge where space permits for discharging some of the internal cooling air for locally cooling the trailing edge region of the vane. In turbine nozzles, the trailing edge outlets are typically located on the pressure side of the vane and terminate closely adjacent to the trailing edge.

Since gas turbine engines are designed in different configurations for different applications including military, commercial, and industrial applications for powering aircraft, ships, and electrical generators, the associated cooling configurations for the components thereof also vary significantly. In commercial aircraft engines, for example, long life or durability of the engine is desired for minimizing the periodic maintenance requirements therefor, while high efficiency is also desired for decreasing the cost of operation. Long life requires effective cooling, whereas high efficiency requires minimum bleeding of the cooling airflow.

The numerous advances in design of the modern aircraft turbofan engine results in both great efficiency and long life or durability, with actual operating experience now uncovering localized distress in hot turbine components which affects the extended life thereof. For example, the high pressure, first stage turbine nozzle that is subject to the hottest combustion gases in gas turbine engines will eventually experience oxidation and localized cracking of the vanes at the end of its life due to the repeated exposure to the hot combustion gases. The local distress regions of the nozzle vane may be at any location depending upon the specific design of the nozzle and engine, including the leading edge which first receives the hot combustion gases, or the thin trailing edge, or in between.

As indicated above, the nozzle vane cooling configurations may be specifically tailored for addressing the various cooling requirements thereof including the leading edge and trailing edge regions, but this tailoring comes with a price. A given or limited amount of cooling air is available for each nozzle vane, and that cooling air budget must be distributed over the entire vane for selectively cooling the various portions thereof. Increasing cooling air to one portion of the vane necessarily decreases cooling air to other portions for a given cooling air budget.

Furthermore, redistributing the cooling air budget in a nozzle vane correspondingly affects the overall cooling thereof, and may also affect the aerodynamic performance of the nozzle itself as the cooling air is discharged through the various outlet holes covering the vane. Yet further, the pressurized cooling air delivered to the turbine nozzle is a portion of the highest pressure compressor discharge air, which discharge air is also used for cooling the liners of the combustor itself. Another balance in the design is required for cooling the turbine nozzle as well as the combustor liners using the same source air, with corresponding limited or budgeted amounts thereof.

The great sophistication and complexity of designing modern turbofan engines is further exemplified in evaluating a pre-existing first stage HPT nozzle which has been on sale and in commercial public use for decades in the U.S. This extremely mature turbine nozzle has continually undergone small changes in the configuration thereof for further enhancing its performance and durability.

In particular, this pre-existing nozzle includes a pattern of outlet holes over both the pressure and suction sides of the nozzle vanes which use the limited budget of cooling air for effective cooling of the nozzle vanes for extended life and durability. The pattern includes rows of showerhead film cooling holes bridging the pressure and suction sides of the vane at the leading edge, and a row of trailing edge outlet slots along the pressure side. Rows of gill film cooling holes are found in the suction side downstream of the showerhead holes, and additional rows of film cooling holes are found on the pressure side downstream from the showerhead holes.

The original configuration of this pre-existing design included eight rows of showerhead holes bridging the leading edge. One row extended along the leading edge. Four rows were disposed on the pressure side aft therefrom. And, three rows were disposed on the suction side aft of the leading edge. These eight rows effectively cooled the leading edge region of the nozzle vane.

However, actual operating experience uncovered local distress or oxidation on the suction side downstream of the showerhead holes, and therefore in a modification of the original design, the aft-most end row of showerhead holes on the pressure side was moved from the pressure side to the suction side immediately downstream of the aft-most row of showerhead holes on the suction side for maintaining the original cooling air budget while addressing the local suction side distress. This modified nozzle vane has also enjoyed many years of commercial public use and success in the U.S.

However, further experience in the use of this modified nozzle design is showing local distress in the region of the pressure side leading edge where the first row of showerhead holes was removed. Furthermore, additional local distress is also being experienced on the suction side of the same vanes near the trailing edge.

This modified nozzle vane, like its parent, includes two rows of cylindrical film cooling gill holes located immediately downstream of the showerhead holes on the suction side of the vane that provide film cooling thereover to the trailing edge of the vane. Two rows of such gill holes are used for minimizing the amount of cooling air required for cooling the suction side of the vane.

In a second pre-existing first stage HPT nozzle design for a different turbofan gas turbine engine enjoying many years of successful commercial public use in the U.S., a different pattern of outlet holes is found over the pressure and suction sides of the nozzle vane, including a pair of closely spaced film cooling gill holes disposed aft of multiple rows of showerhead holes at the leading edge. This second pre-existing turbine nozzle also experienced local distress over the suction side at the trailing edge, which was addressed by spreading the aft row of gill holes downstream from the forward row of gill holes, and changing the configurations thereof from conventional cylindrical film cooling holes to conventional diffusion holes having cylindrical inlets and diverging outlets. The flow size of these gill holes remained the same for maintaining the limited cooling air budget.

There are, of course, a multitude of solutions which may be used for attempting to solve these problems of local distress at two different locations on the first pre-existing nozzle vane on the pressure side leading edge and the suction side trailing edge. However, the desire to maintain the same limited cooling air budget for turbine nozzle cooling substantially increases the difficulty of the solution.

For example, merely re-introducing the removed row of pressure side showerhead holes will correspondingly increase the cooling air requirement, which in turn can change the overall cooling performance of the nozzle vane itself, the aerodynamic performance of the nozzle, and the cooling performance of the combustion liners which also utilize compressor discharge air for cooling. Attempting to decrease the size of the showerhead holes to limit the need for additional cooling air, will correspondingly adversely affect their cooling performance at the leading edge in particular.

Furthermore, resolving the local distress on the suction side trailing edge region can also affect cooling performance of the entire nozzle, including the local distress at the pressure side leading edge.

Accordingly, it is desired to provide a turbine nozzle having an improved configuration for cooling thereof while maintaining a limited air budget therefor.

BRIEF DESCRIPTION OF THE INVENTION

A turbine nozzle includes hollow vanes extending between outer and inner bands. The vanes include a pattern of outlet holes distributed over the pressure and suction sides thereof for discharging cooling air collectively at a reference flowrate. The pattern of holes includes multiple rows of showerhead holes bridging the leading edge, and two rows of gill holes spaced aft therefrom along the suction side. A row of auxiliary holes is spaced aft from the showerhead holes through the pressure side, and the gill holes are sized to counterbalance the added discharge air through the auxiliary holes for maintaining the reference flowrate.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
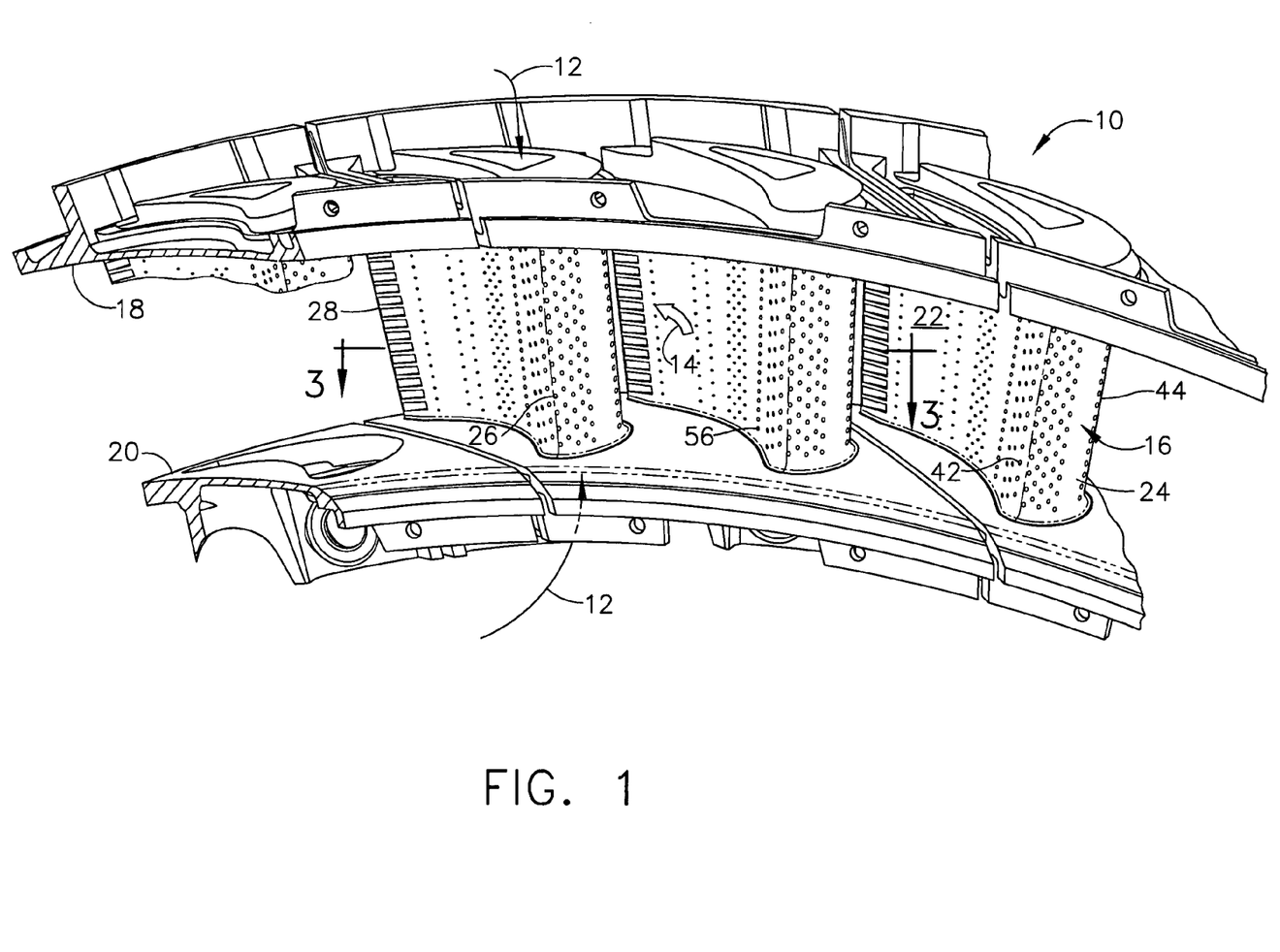
FIG. 1 is an isometric view of an arcuate portion of an annular first stage high pressure turbine nozzle for a gas turbine engine.

Illustrated in FIG. 1 is a portion of an annular first stage high pressure turbine nozzle 10 which is axisymmetrical about a longitudinal or axial centerline axis. The nozzle is configured for use in a gas turbine engine having a multistage axial compressor (not shown) which pressurizes air 12 for discharge into an annular combustor (not shown).

The compressor discharge air is mixed with fuel in the combustor for generating hot combustion gases 14 which flow through the turbine nozzle to high pressure turbine rotor blades (not shown) which extract energy therefrom for powering the compressor. A low pressure turbine (not shown) follows the high pressure turbine for extracting additional energy from the combustion gases for driving an output shaft, which may be joined to an upstream fan in an exemplary turbofan aircraft gas turbine engine application.

Figure 2:
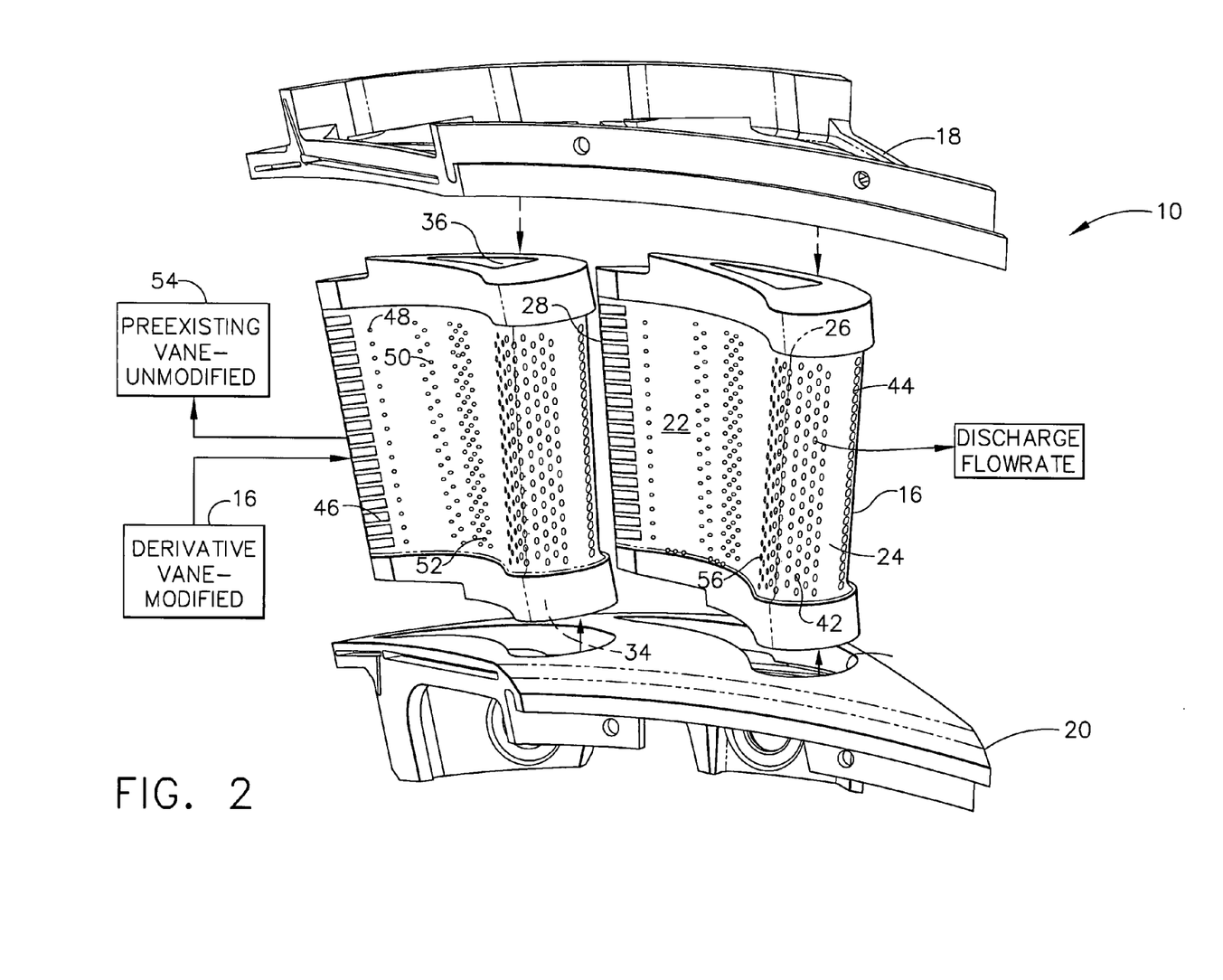
FIG. 2 is an exploded view of a segment of the nozzle illustrated in FIG. 1.

The exemplary turbine nozzle illustrated in FIGS. 1 and 2 includes a row of hollow airfoils or vanes 16 fixedly joined at opposite ends thereof to corresponding radially outer and inner bands 18,20. The bands are typically formed in arcuate segments including two vanes, and the segments adjoin circumferentially to form complete rings having suitable inter-segment seals therebetween. The individual vanes are typically brazed into corresponding apertures in the outer and inner bands through which the pressurized cooling air 12 is delivered thereto.

Figure 3:
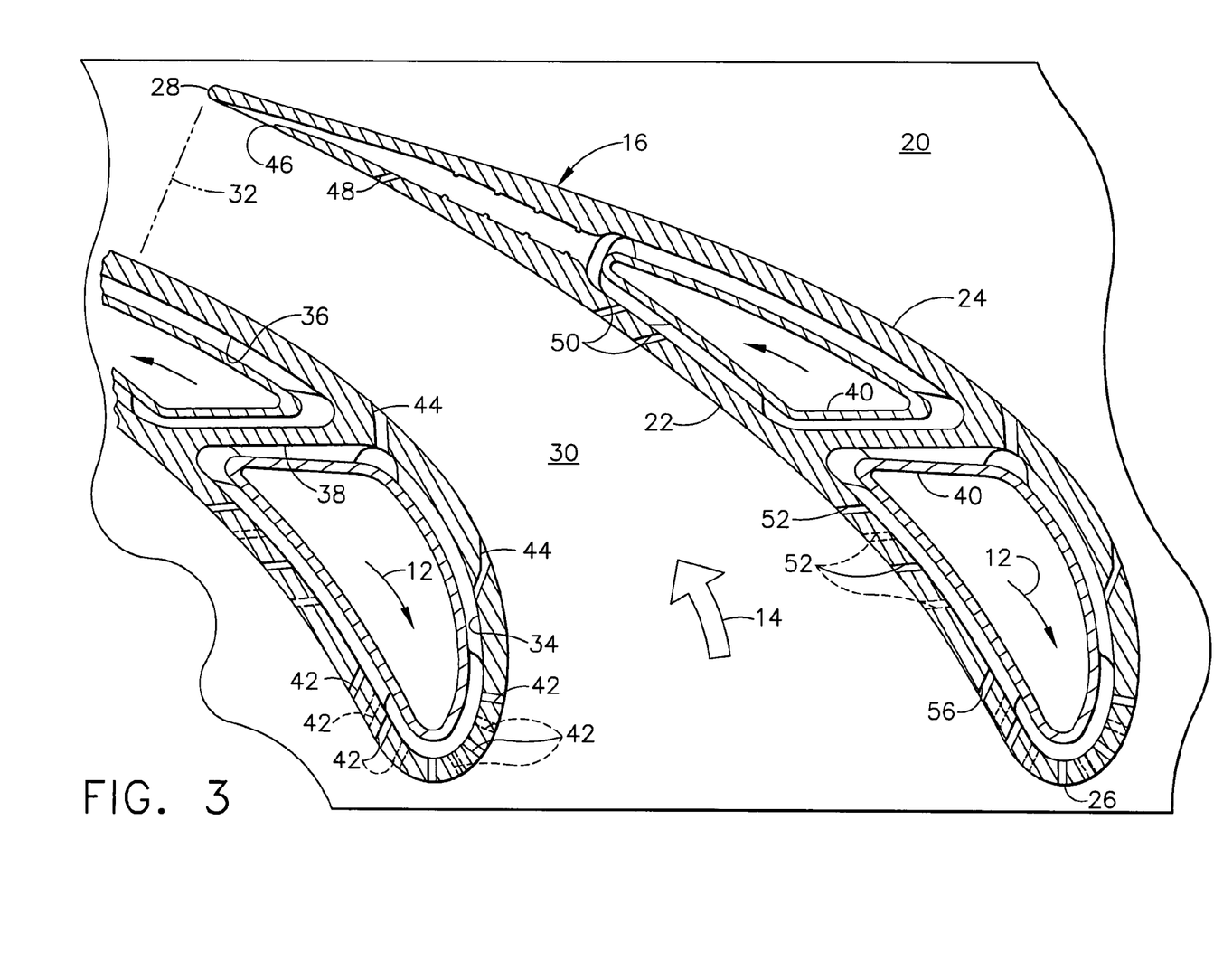
FIG. 3 is a radial sectional view through a pair of nozzle vanes illustrated in FIG. 1 and taken along line 3—3.

Each of the nozzle vanes illustrated in FIGS. 2 and 3 includes a generally concave pressure sidewall or side 22 and a circumferentially opposite, generally convex suction sidewall or side 24. The two sides extend radially in span between the outer and inner bands, and extend axially in chord between opposite leading and trailing edges 26,28.

As shown in FIG. 3, the vanes are spaced circumferentially apart from each other, and have airfoil configurations which define converging flow passages 30 between the opposing pressure and suction sides thereof. The trailing edge 28 of one vane forms with the suction side of the next adjacent vane forward of the trailing edge thereof a throat 32 of minimum flow area between the vanes through which the combustion gases 14 are accelerated during operation. The throat 32 is typically defined by a plane perpendicular to the suction side of one vane to the trailing edge of the next vane.

In the exemplary embodiment illustrated in FIG. 3, each vane 16 includes a forward flow passage or cavity 34 and an aft flow passage or cavity 36 separated from each other by an imperforate cold bridge 38. The forward cavity is located directly behind the leading edge, and the aft cavity is separated therefrom by the cold bridge 38 which is integrally formed between the two vane sides. The aft cavity is spaced forwardly from the thin vane trailing edge 28 where space permits.

Corresponding forward and aft impingement baffles 40 are disposed in the two cavities 34,36. The baffles are perforate and conventionally include small apertures through which the pressurized cooling air 12 is firstly channeled in impingement against the internal surfaces of the pressure and suction sides of the vane prior to discharge therefrom. The cooling air is suitably received from the discharge end of the compressor and delivered through inlet apertures in the outer and inner bands in the exemplary embodiment.

As shown in FIGS. 1 and 2, the aft cavity 36 is closed at its inner end in the inner band and includes an inlet at its outer end in the outer band for receiving the cooling air. In contrast, the forward cavity 34 is closed at its outer end in the outer band and includes an inlet at its inner end in the inner band for receiving the cooling air. The internal bridge 38 illustrated in FIG. 3 separates the forward and aft cavities from each other for separately controlling cooling of the forward portion of the vane from cooling of the aft portion of the vane separated along the bridge plane.

As initially shown in FIGS. 1 and 2, each vane includes identical patterns of outlet holes extending through the sidewalls thereof, and distributed over the pressure and suction sides for discharging the cooling air therefrom The total flowrate of cooling air provided to each nozzle vane is preferably predetermined and fixed at the desired design point for the particular engine configuration. As indicated above, it is desired to limit the amount of the pressurized cooling air 12 bled from the compressor during operation for maximizing efficiency of the engine.

The full pattern or complement of the outlet holes in each vane therefore collectively effects a fixed, or reference flowrate of the cooling air being channeled firstly into the inside of each vane and then discharged through the vane walls.

A pattern of outlet holes in the exemplary configuration illustrated in FIGS. 1–4 includes multiple radial rows of showerhead holes 42 bridging the leading edge 26 through both pressure and suction sides. As best shown in FIG. 5, the pattern also includes two rows of axially inclined, film cooling gill holes 44 spaced aft from the showerhead holes along the suction side 24.

Figure 4:
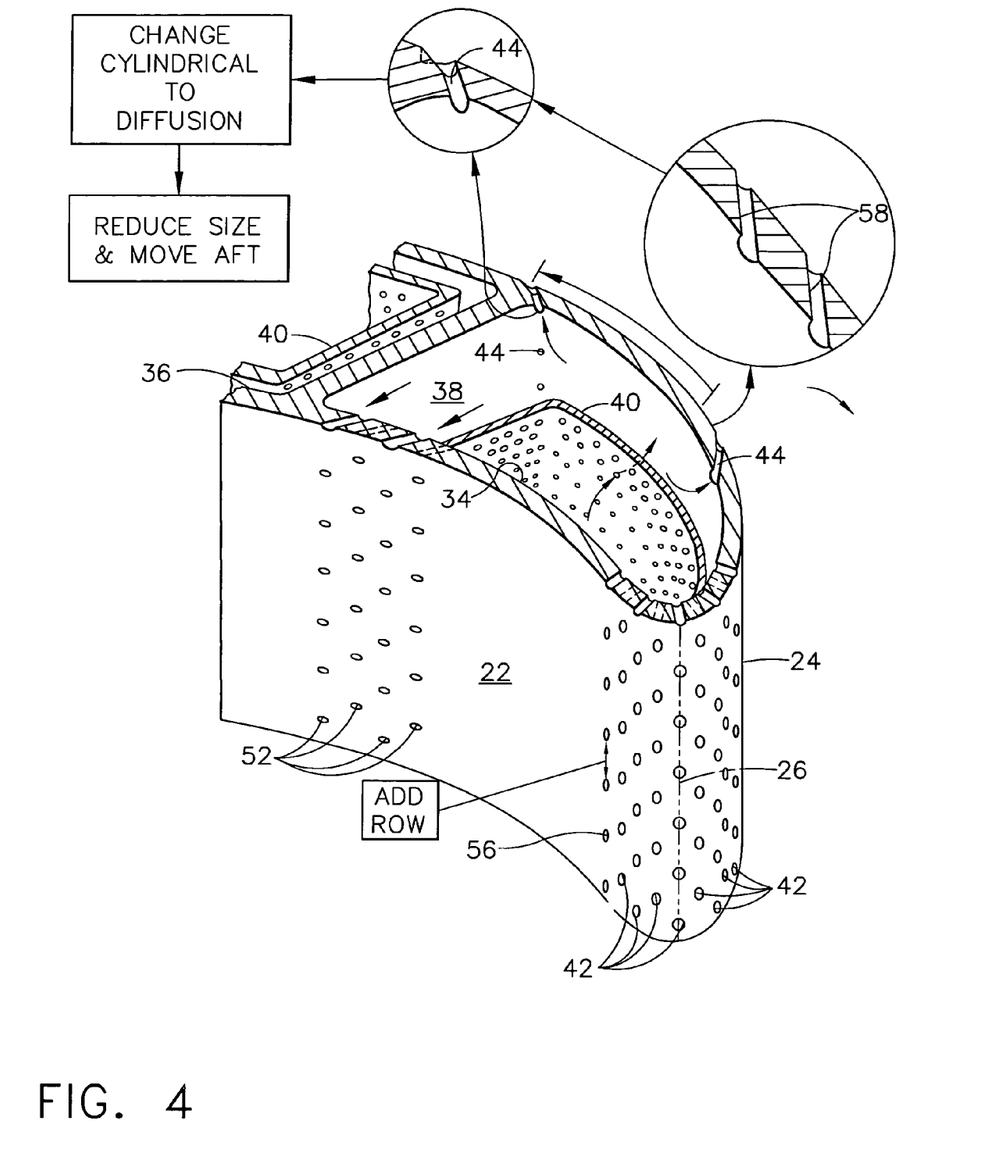
FIG. 4 is an enlarged isometric view of the leading edge portion of the nozzle vanes from the pressure side.
Figure 5:
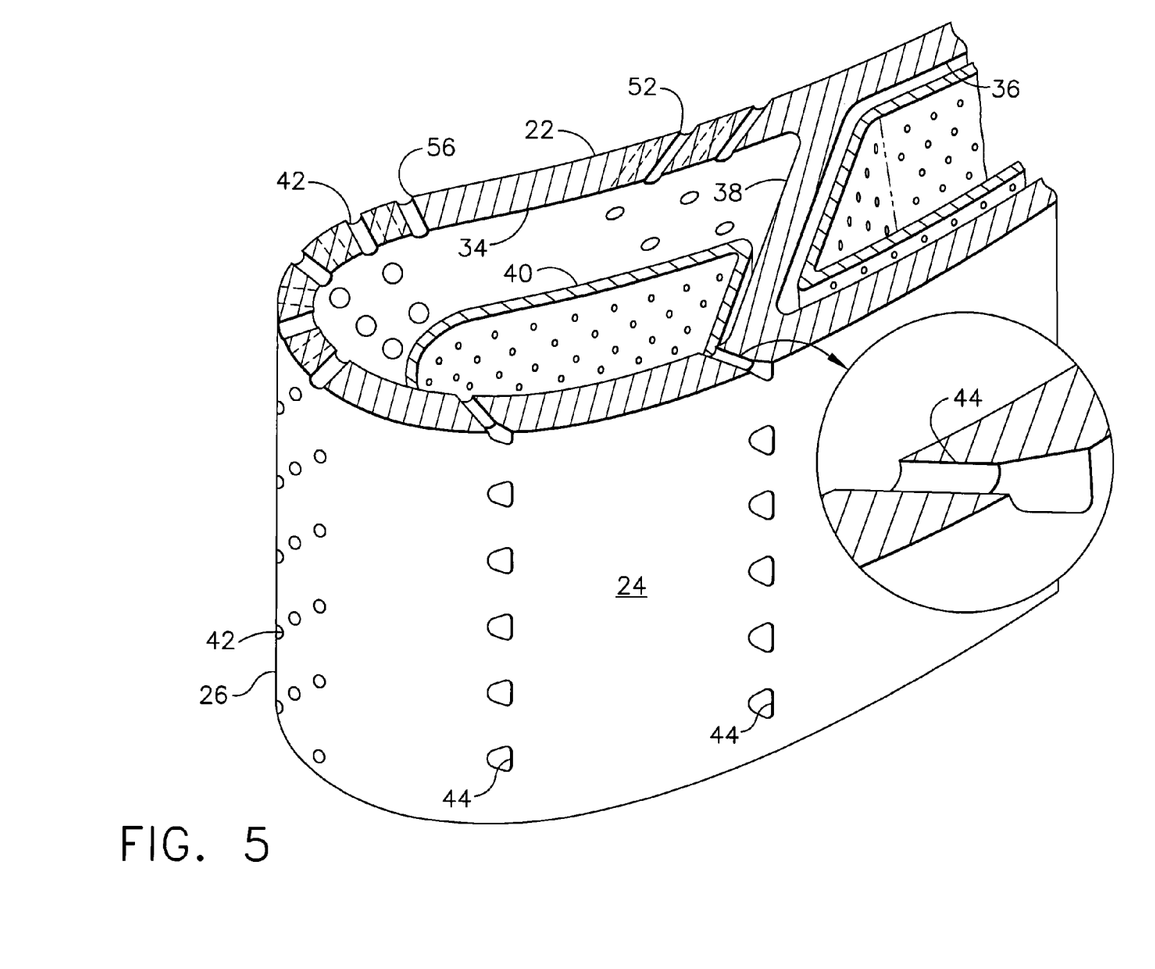
FIG. 5 is an enlarged isometric view of the leading edge portion of the nozzle vanes from the suction side.

As shown in FIGS. 2–4, the outlet hole pattern in this exemplary embodiment further includes a row of conventional trailing edge slots 46 terminating at the trailing edge 28 along the pressure side 22, and having inlets extending upstream to and disposed in flow communication with the aft cavity 36 for discharging air therefrom.

The pattern further includes one row of film cooling holes 48 extending through the pressure side between the trailing edge slots and the aft cavity, and two rows of additional film cooling holes 50 also extending through the pressure side, but adjacent to the aft end of the aft cavity 36. Four additional rows of film cooling holes 52 are found in the pattern on the pressure side of the vane adjacent the aft end of the forward cavity 34.

The various showerhead holes 42, gill holes 44, trailing edge slots 46, and film cooling holes 48–52 have conventional configurations, and are typically inclined through the corresponding pressure and suction sidewalls in common radial planes, without vertical inclination along the vane span. In other embodiments, the holes may have compound inclination angles both vertically along the vane span and horizontally along radial cross sections of the vane.

As illustrated schematically in FIG. 2, the turbine nozzle 10 may be otherwise conventional and based on the first, pre-existing turbine nozzle disclosed above in the Background section, but suitably modified. For example, the pre-existing, unmodified nozzle vane is designated 54 in FIG. 2 and is substantially identical to the modified or derivative vane 16 illustrated therein, except for the modifications thereof as further described hereinbelow.

For example, the pattern of eight-row outlet holes 42 and holes 46–52 is identical to the pre-existing pattern in the first turbine nozzle described above enjoying successful decades of commercial use. Even the two rows of gill holes 44 are found in the first pre-existing turbine nozzle, but have modified configurations in the resulting derivative nozzle and vane.

More specifically, the multiple rows of showerhead holes 42, best illustrated in FIG. 4, include one row along the vane leading edge 26, four rows along the suction side 24, and three rows along the pressure side 22 for a total of eight rows. These eight rows are substantially identical to those found in the first parent nozzle disclosed above in the Background section for providing distributed cooling of the vane in the immediate region of the leading edge thereof.

However, as indicated above in the Background section, experience has uncovered early signs of local distress of the vane immediately aft of the original showerhead holes on the vane pressure side. Accordingly, a row of auxiliary showerhead holes 56 is added and is spaced directly aft from the aft-most row of original showerhead holes 42 through the vane pressure side 22. In other words, the auxiliary holes 56 introduce a ninth row of the showerhead holes 42 bridging the vane leading edge, with four rows on the opposite sides thereof, and one row along the leading edge itself.

In this way, the additional row of auxiliary holes 56 provides additional film cooling in the immediate region thereof for reducing the local temperature distress discovered in this region.

However, in view of the fixed or limited cooling air budget for the entire nozzle vane, the additional row of auxiliary holes 56 cannot be added without a corresponding modification of the vane to offset or counterbalance the additional airflow therethrough, and without compromising cooling effectiveness of the various outlet holes of each nozzle vane, and without compromising performance of the nozzle vanes themselves, and without compromising cooling performance of the combustor liners which share the use of the compressor discharge air for cooling thereof.

FIG. 4 illustrates schematically the original configuration and location of the original gill holes, designated 58, on the suction side of the nozzle vane previously found in the parent, first turbine nozzle disclosed above in the Background section. The original gill holes 58 were closely spaced together, and inclined axially through the suction sidewall. The original gill holes were cylindrical in configuration with a nominal diameter of about 0.86 mm.

The two rows of modified gill holes 44 match the general pattern of the original two rows of gill holes 58 but are modified in configuration, size, and relative placement to offset or counterbalance the added discharge of the cooling air through the auxiliary holes 56 for maintaining substantially the same collective or reference flowrate of the cooling air through each nozzle vane. In other words, the total flowrate of cooling air used in each nozzle vane remains substantially the same with or without the use of the auxiliary holes 56, in combination with the specific configuration of the gill holes.

For example, the showerhead holes 42 and auxiliary holes 56 preferably have substantially equal size as represented by the nominal diameters thereof, or their flow areas, with the modified gill holes 44 being larger in size than the showerhead and auxiliary holes, but smaller in size than their original gill counterparts 58.

Both the showerhead holes 42 and auxiliary holes 56 illustrated in FIG. 4 have cylindrical configurations extending transversely through the vane sidewalls, with cylindrical inlets on the inside of the vane and cylindrical outlets on the outside of the vane, which vary slightly in configuration to conform with the convex curvature of the vane around the leading edge.

Correspondingly, the gill holes 44 have conventional diffusion configurations with cylindrical inlets on the inside of the vane, and diverging, generally trapezoidal outlets on the outside of the vane. The diffusion gill holes 44 replace the conventional cylindrical configuration of the original gill holes 58.

As shown in FIGS. 4 and 5, the modified gill holes 44 include a forward row adjacent the showerhead holes 42, in substantially the same axial location as in the first pre-existing turbine nozzle described above, disposed in flow communication with the forward cavity 34 for receiving therefrom the spent impingement air for discharge from the vane. The gill holes 44 also include an aft row thereof spaced aft from the forward row adjacent the junction of the suction side 24 and the cold bridge 38, and also disposed in flow communication with the forward cavity 34 for receiving the spent impingement air therefrom.

The added row of auxiliary holes 56 in the vane pressure side is compensated by the preferred modification of the two rows of gill holes 44. The difference in pressure and temperature distribution of the combustion gases on the opposite sides of the nozzle vane permit modification of the gill holes to compensate for the added auxiliary holes without compromising cooling and aerodynamic performance of the turbine nozzle, while improving the two different local stress regions at the pressure side leading edge and suction side trailing edge, all without increasing the required flowrate of the cooling air for the nozzle vane.

The smaller flow area diffusion gill holes 44 effectively offset the increased flow area of the auxiliary holes 56 notwithstanding the differential pressure acting thereacross due to the different pressure distributions on the pressure and suction sides of the vane. The diffusion form of the gill holes 44 is more effective for cooling the vane suction side than their parent cylindrical counterparts, which is a conventionally known benefit.

Furthermore, the axial spacing between the two rows of gill holes 44 may be increased as shown in FIG. 4 over the previous close spacing used for the original cylindrical gill holes 58. By relocating the aft row of diffusion gill holes to the junction with the cold bridge 38, the cooling air film discharged therefrom more effectively carries to the trailing edge of the vane for reducing the local temperature distress at the suction side trailing edge.

As shown in FIG. 3, by moving the aft row of gill holes 44 to the junction with the cold bridge 38, the aft row is disposed generally midway between the outlet throat 32 of the flow passage 30 and the adjacent vane leading edges defining the inlet to that flow passage.

It is noted from the second pre-existing turbine nozzle disclosed above in the Background section that the introduction of diffusion gill holes for cylindrical counterparts, and the increased spacing therebetween, is conventionally known to reduce the local temperature distress at the trailing edge suction side. But, that solution is for a differently configured turbine nozzle with a different pattern of outlet holes, and that solution maintains the same nominal flow area size of the diffusion holes as for their parent cylindrical counterparts.

In the present configuration of the turbine nozzle, the auxiliary showerhead holes 56 may be added for reducing the local temperature distress at the leading edge pressure side, with the additional airflow therethrough being compensated for or counterbalanced by the decrease in airflow through the modified diffusion gill holes.

Accordingly, the derivative turbine nozzle and modified vanes thereof may remain substantially identical to their pre-existing, parent turbine nozzle and unmodified vanes which have enjoyed decades of successful commercial use, with the specific modifications thereof being limited to the introduction of the auxiliary holes 56 and corresponding modification of the gill holes 44. The derivative turbine nozzle may therefore be used in retrofitting the existing commercial fleet of turbofan gas turbine engines which use the unmodified parent turbine nozzles. The derivative turbine nozzle can reduce the local temperature distress at the pressure side leading edge and suction side trailing edge for further increasing the durability and life of the turbine nozzle, and increasing the intervals between maintenance outages therefor.

The derivative turbine nozzle illustrated in FIG. 2 includes the original pattern of eight rows of showerhead holes 42, with each row consisting of sixteen (16) holes between the outer and inner bands, with each hole 42 having a diameter of about 0.66 mm. Correspondingly, the added auxiliary holes 56 preferably consist of sixteen (16) holes in the row distributed between the outer and inner bands, with each of the auxiliary holes having a diameter of about 0.66 mm. In this way, the auxiliary holes 56 join the other showerhead holes 42 in a complete pattern of identical holes which effectively cool the leading edge region of each vane subject to impingement of the hottest combustion gases during operation.

The modified gill holes 44 preferably consist of twenty-five (25) holes per row between the outer and inner bands, with each gill hole 44 having an inlet diameter of about 0.76 mm, with an outlet diverging therefrom in a conventional manner. The number of modified gill holes 44 identically matches the number of cylindrical gill holes 58 found in the parent first turbine nozzle disclosed above.

Accordingly, by the precise introduction of the row of auxiliary holes 56 and the corresponding modification of the gill holes 44 in the otherwise conventional turbine nozzle, a significant improvement in durability and life of the nozzle may be obtained without adversely affecting either aerodynamic or cooling performance of the nozzle. The gill holes are reduced in size to offset the added flow area of the auxiliary holes without compromising cooling performance of the gill holes themselves.

The gill holes are modified from cylindrical configurations to conventional diffusion configurations to increase their effectiveness, notwithstanding the loss in airflow therethrough. And, the rows of gill holes are further spaced apart from each other for effecting cooling air films which extend downstream therefrom to the trailing edge of the vane for effectively film cooling the vane suction side, including the discovered local temperature distress region at the trailing edge thereof.

Furthermore, computer analysis of the performance of the so-modified turbine nozzle predicts that the entire outlet hole pattern combined with the modification of the gill holes provides effective and balanced cooling of the entirety of the nozzle vane, while balancing the split in cooling airflow between the pressure and suction sides thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   a pair of hollow vanes fixedly joined to outer and inner bands, and each vane including opposite pressure and suction sides extending in span between said bands, and extending in chord between leading and trailing edges;
   said trailing edge of a first one of said vanes forming with said suction side of a second one of said vanes forward of said trailing edge thereof a throat of minimum flow area between said vanes;
   each of said vanes further including identical patterns of outlet holes distributed over said pressure and suction sides thereof for discharging cooling air therefrom collectively at a reference flowrate through each vane;
   said patterns of holes including multiple rows of showerhead holes bridging said leading edge, and two rows of gill holes spaced aft from said showerhead holes along said suction sides of said vanes;
   a row of auxiliary holes spaced aft from said showerhead holes through said pressure side in each vane; and
   said gill holes being sized to counterbalance added discharge of said cooling air through said auxiliary holes for maintaining said reference flowrate.

2. A nozzle according to claim 1 wherein said showerhead holes and auxiliary holes have substantially equal size, and said gill holes are larger.

3. A nozzle according to claim 2 wherein:
   said showerhead holes and auxiliary holes have cylindrical configurations; and
   said gill holes have diffusion configurations.

4. A nozzle according to claim 3 wherein:
   each of said vanes includes a forward cavity behind said leading edge separated by a bridge from an aft cavity in front of said trailing edge; and
   said gill holes include a forward row adjacent said showerhead holes and an aft row spaced aft therefrom adjacent said bridge, with both rows of gill holes being disposed in flow communication with said forward cavity for discharging said air therefrom.

5. A nozzle according to claim 4 wherein said forward and aft cavities include corresponding forward and aft impingement baffles for firstly impinging said cooling air against internal surfaces of said pressure and suction sides prior to discharge from said vanes through said outlet holes and auxiliary holes.

6. A nozzle according to claim 5 wherein said showerhead holes include one row along said leading edge, four rows along said suction side, and three rows along pressure side adjacent said row of auxiliary holes.

7. A nozzle according to claim 6 wherein said outlet hole pattern further comprises:
   a row of trailing edge slots terminating at said trailing edge along said pressure side, and disposed in flow communication with said aft cavity for discharging said air therefrom;
   one row of film cooling holes extending through said pressure side between said trailing edge slots and said aft cavity;
   two rows of film cooling holes extending through said pressure side adjacent an aft end of said aft cavity; and
   four rows of film cooling holes extending through said pressure side adjacent an aft end of said forward cavity.

8. A nozzle according to claim 7 wherein:
said showerhead holes consist of sixteen holes per row per vane between said outer and inner bands, each hole having a diameter of about 0.66 mm;
said auxiliary holes consist of sixteen holes per vane distributed between said outer and inner bands, each hole having a diameter of about 0.66 mm; and
said gill holes consist of twenty-five holes per row per vane between said outer and inner bands, each hole having an inlet diameter of about 0.76 mm.

9. A nozzle according to claim 8 wherein said aft rows of gill holes are disposed generally midway between said vane leading edges and said throat.

10. A nozzle according to claim 8 wherein said pattern of outlet holes is pre-existing, and said gill holes have modified configurations to counterbalance airflow from said auxiliary holes to form a derivative turbine nozzle having substantially the same discharge flowrate of said cooling air therethrough as said nozzle unmodified.

11. A turbine nozzle comprising:
a hollow vane including opposite pressure and suction sides extending in span between outer and inner hands, and extending in chord between leading and trailing edges;
said vane further including a pattern of outlet holes distributed over said pressure and suction sides for discharging cooling air therefrom collectively at a reference flowrate;
said pattern of holes including multiple rows of showerhead holes bridging said leading edge, and two rows of gill holes spaced aft from said showerhead holes along said suction side;
a row of auxiliary holes spaced aft from said showerhead holes through said pressure side; and
said gill holes being sized to counterbalance added discharge of said cooling air through said auxiliary holes for maintaining said reference flowrate.

12. A nozzle according to claim 11 wherein said showerhead holes and auxiliary holes have substantially equal size, and said gill holes are larger.

13. A nozzle according to claim 12 wherein:
said showerhead holes and auxiliary holes have cylindrical configurations; and
said gill holes have diffusion configurations.

14. A nozzle according to claim 13 wherein:
said vane includes a forward cavity behind said leading edge separated by a bridge from an aft cavity in front of said trailing edge; and
said gill holes include a forward row adjacent said showerhead holes and an aft row spaced aft therefrom adjacent said bridge, with both rows of gill holes being disposed in flow communication with said forward cavity for discharging said air therefrom.

15. A nozzle according to claim 14 wherein said showerhead holes include one row along said leading edge, four rows along said suction side, and three rows along said pressure side adjacent said row of auxiliary holes.

16. A nozzle according to claim 14 wherein said outlet hole pattern further comprises:
a row of trailing edge slots terminating at said trailing edge along said pressure side, and disposed in flow communication with said aft cavity for discharging said air therefrom;
one row of film cooling holes extending through said pressure side between said trailing edge slots and said aft cavity;
two rows of film cooling holes extending through said pressure side adjacent an aft end of said aft cavity; and
four rows of film cooling holes extending through said pressure side adjacent an aft end of said forward cavity.

17. A nozzle according to claim 14 wherein:
said showerhead holes consist of sixteen holes per row between said outer and inner bands, each hole having a diameter of about 0.66 mm;
said auxiliary holes consist of sixteen holes distributed between said outer and inner bands, each hole having a diameter of about 0.66 mm; and
said gill holes consist of twenty-five holes per row between said outer and inner bands, each hole having an inlet diameter of about 0.76 mm.

18. A nozzle according to claim 14 wherein said forward and aft cavities include corresponding forward and aft impingement baffles for firstly impinging said cooling air against internal surfaces of said pressure and suction sides prior to discharge from said vane through said outlet holes and auxiliary holes.

19. A nozzle according to claim 14 wherein said pattern of outlet holes is pre-existing, and said gill holes have modified configurations to counterbalance airflow from said auxiliary holes to form a derivative turbine nozzle having substantially the same discharge flowrate of said cooling air therethrough as said nozzle unmodified.

20. A nozzle according to claim 14 further comprising:
a pair of said vanes fixedly joined to said outer and inner bands in an arcuate nozzle segment therewith;
said trailing edge of a first one of said vanes forming with said suction side of a second one of said vanes forward of said trailing edge thereof a throat of minimum flow area between said vanes; and
said aft row of gill holes being disposed generally midway between said vane leading edges and said throat.

* * * * *